(12) United States Patent
Yuan et al.

(10) Patent No.: US 11,245,462 B2
(45) Date of Patent: Feb. 8, 2022

(54) SIGNAL TRANSMISSION AND RECEPTION USING MULTIPLE ANTENNAS

(71) Applicant: ZTE Corporation, Guangdong (CN)

(72) Inventors: Zhifeng Yuan, Guangdong (CN); Weimin Li, Guangdong (CN); Yuzhou Hu, Guangdong (CN); Xun Yang, Guangdong (CN); Hong Tang, Guangdong (CN); Jianqiang Dai, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 16/991,793

(22) Filed: Aug. 12, 2020

(65) Prior Publication Data

US 2020/0373994 A1     Nov. 26, 2020

Related U.S. Application Data

(63) Continuation of application No. PCT/CN2018/076446, filed on Feb. 12, 2018.

(51) Int. Cl.
*H04L 23/02* (2006.01)
*H04B 7/08* (2006.01)
*H04B 17/336* (2015.01)
*H04B 7/06* (2006.01)

(52) U.S. Cl.
CPC ......... *H04B 7/0857* (2013.01); *H04B 7/0663* (2013.01); *H04B 7/0678* (2013.01); *H04B 17/336* (2015.01)

(58) Field of Classification Search
CPC ....... H04L 1/0054; H04L 1/005; H04L 27/26; H04L 27/36; H04L 72/046; H04B 1/69; H04B 7/0456; H04W 74/0833; H04W 72/14; H04W 76/20

USPC ......................................... 375/262, 260, 267
See application file for complete search history.

(56) References Cited

U.S. PATENT DOCUMENTS

| | | | |
|---|---|---|---|
| 2008/0181285 A1 | 7/2008 | Hwang et al. | |
| 2008/0225960 A1 | 9/2008 | Kotecha et al. | |
| 2009/0051594 A1 | 2/2009 | Na et al. | |
| 2009/0201902 A1* | 8/2009 | Miki ..................... | H04W 88/08 370/342 |
| 2010/0111211 A1 | 5/2010 | Han et al. | |
| 2012/0009917 A1 | 1/2012 | Baker et al. | |

(Continued)

FOREIGN PATENT DOCUMENTS

| CN | 101834642 A | 9/2010 |
|---|---|---|
| CN | 102356566 A | 2/2012 |

(Continued)

OTHER PUBLICATIONS

Yuan, Z. et al., "Blind Multiple User Detection for Grant-free MUSA without Reference Signal," 2017 IEEE 86th Vehicular Technology Conference, Sep. 2017.

(Continued)

*Primary Examiner* — Khai Tran

(57) ABSTRACT

In an exemplary embodiment, a network node can receive signals from user devices in a wireless communication network. The network node can combine the signals received at each receive antenna of the network node based on vectors from a pre-defined set of vectors. The network node can also process the combined signals to obtain an estimate of the signals.

16 Claims, 9 Drawing Sheets

(56) References Cited

U.S. PATENT DOCUMENTS

| | | | |
|---|---|---|---|
| 2012/0093200 A1* | 4/2012 | Kyeong | H04B 7/0897 375/144 |
| 2018/0048378 A1* | 2/2018 | Kotecha | H04B 7/0619 |
| 2020/0059935 A1* | 2/2020 | Qian | H04W 74/02 |
| 2020/0404634 A1* | 12/2020 | He | H04L 1/1887 |

FOREIGN PATENT DOCUMENTS

| | | |
|---|---|---|
| CN | 104205695 A | 12/2014 |
| EP | 1471663 A2 | 10/2004 |
| EP | 1865625 A1 | 12/2007 |
| EP | 2378688 B1 | 1/2013 |

OTHER PUBLICATIONS

Extended European Search Report for European Patent Application No. 18904829.1, dated Jan. 29, 2021.
International Search Report and Written Opinion dated Nov. 1, 2018 for International Application No. PCT/CN2018/076446, filed on Feb. 12, 2018 (6 pages).
Office Action for Chinese Patent Application No. 201880087927.X, dated Apr. 30, 2021.
Office Action for Chinese Patent Application No. 201880087927.X, dated Oct. 19, 2021 (10 pages).

\* cited by examiner

SIGNAL TRANSMISSION AND RECEPTION USING MULTIPLE ANTENNAS

CROSS REFERENCE TO RELATED APPLICATIONS

This patent document is a continuation of and claims benefit of priority to International Patent Application No. PCT/CN2018/076446, filed on Feb. 12, 2018. The entire content of the before-mentioned patent application is incorporated by reference as part of the disclosure of this application.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, further advances the LTE and LTE-A wireless standards and is committed to supporting higher data-rates, large number of connections, ultra-low latency, high reliability and other emerging business needs.

Massive Machine-type communication (mMTC) is anticipated to be one of the important use cases in the future generations of wireless network. It has been forecasted that a massive number of devices (UEs) of connection density of at least $10^6$ devices/km$^2$ may connect to the wireless network to transmit sporadic small data packets.

SUMMARY

An exemplary embodiment discloses a wireless communication method. The exemplary method comprises receiving, by a network node, signals from user devices in a wireless communication network, combining, based on vectors from a pre-defined set of vectors, the signals received by the network node, and processing the combined signals to obtain an estimate of the signals.

In some embodiments, each vector corresponds to a code having a length equal to a number of receive antennas of the network node. In some embodiments, each vector has elements from a set $\{1, j, -1, -j, 0\}$, or a set $\{1, -1, 0\}$, or a set $\{1, j, -j, -1\}$, or a set $\{1+j, 1-j, -1+j, -1-j, 0\}$, or a set $\{1+j, 1-j, -1+j, -1-j\}$.

In some embodiments, the combining the signals comprises multiplying each vector with the signals received at each receive antenna of the network node to obtain a set of combined signals. In some embodiments, the combining the signals comprises determining a weighted sum of the signals received from a plurality of receive antennas of the network node by a corresponding code of each vector.

In some embodiments, the processing of the combined signals comprises at least one of de-spreading each combined signal using each spreading code from a set of pre-determined spreading codes, de-scrambling each combined signal using each scrambling code from a set of pre-determined scrambling codes, de-interleaving each combined signal using each interleaver from a set of pre-determined interleavers, and performing differential decoding on each combined signal.

In some embodiments, the processing of the combined signals comprises de-spreading each combined signal using each spreading code from a set of pre-determined spreading codes, performing equalization on each de-spread combined signal to obtain a set of equalized combined signals, selecting a subset of equalized combined signals based on signal-to-interference-plus-noise ratio (SINR) values, and decoding the selected equalized combined signals to obtain the estimate of information bits received from the user devices.

In some embodiments, the processing of the combined signals comprises de-scrambling each combined signal using each scrambling code from a set of pre-determined scrambling codes, performing equalization on each de-scrambled combined signal to obtain a set of equalized combined signals, selecting a subset of equalized combined signals based on signal-to-interference-plus-noise ratio (SINR) values, and decoding the selected equalized combined signals to obtain the estimate of information bits received from the user devices.

In some embodiments, the processing of the combined signals comprises de-interleaving each combined signal using each interleaver from a set of pre-determined interleavers, performing equalization on each de-interleaved combined signal to obtain a set of equalized combined signals, selecting a subset of equalized combined signals based on signal-to-interference-plus-noise ratio (SINR) values, and decoding the selected equalized combined signals to obtain the estimate of information bits received from the user devices.

In some embodiments, the processing of the combined signals comprises performing differential decoding on each combined signal, selecting a subset of differential decoded combined signals based on signal-to-interference-plus-noise ratio (SINR) values, and decoding the selected differential decoded combined signals to obtain the estimate of information bits received from the user devices.

In some embodiments, the pre-defined set of vectors includes at most six vectors and wherein the network node includes two receive antennas. In some embodiments, the pre-defined set of vectors includes at most sixteen vectors or twenty-four vectors and wherein the network node includes four receive antennas. In some embodiments, the pre-defined set of vectors includes at most twenty-four or sixty-four vectors or ninety-six vectors, and wherein the network node includes eight receive antennas.

In some embodiments, the signals are received without a prior scheduling grant for the signals by the network node.

In some embodiments, the signals include reference signals. In such embodiments, the processing of the combined signals comprises estimating a combined channel by using the reference signals in each combined signal, selecting a subset of combined signals based on channel estimation values, performing equalization on each of the subset of combined signals using its channel estimation value to obtain a set of equalized combined signals, and decoding the equalized combined signals to obtain information bits of the signals received from the user devices.

In some embodiments, the processing of the combined signals comprises estimating a combined channel by using the reference signals in each combined signal, processing the combined signals using a previous estimate of the combined channel.

In some embodiments, the signals include any one of spread data symbols, scrambled data symbols, interleaved data symbols, and differential encoded data symbols.

In some embodiments, the wireless communication network includes a massive Machine-type communication (mMTC) network and wherein the user devices comprise machine-type communication devices.

In another exemplary embodiment, a wireless communication method, comprises generating a transmission signal to transmit from a user device in a wireless communication network, wherein the transmission signal includes data for processing by vectors from a set of pre-defined vectors, and the transmission signal is transmitted using a grant free transmission technique.

In some embodiments, the transmission signal includes data that is spread using a spreading code, scrambled using a scrambling code, interleaved using a interleaver, or generated using a differential encoding technique. In some embodiments, the transmission signal includes any one of the spreading sequence information, scrambling code information, interleaver information, and differential encoding information about the transmission signal. In some embodiments, the transmission signal includes a reference signal. In some embodiments, the wireless communication network includes a massive Machine-type communication (mMTC) network and wherein the user device includes a machine-type communication device.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Figure 1:
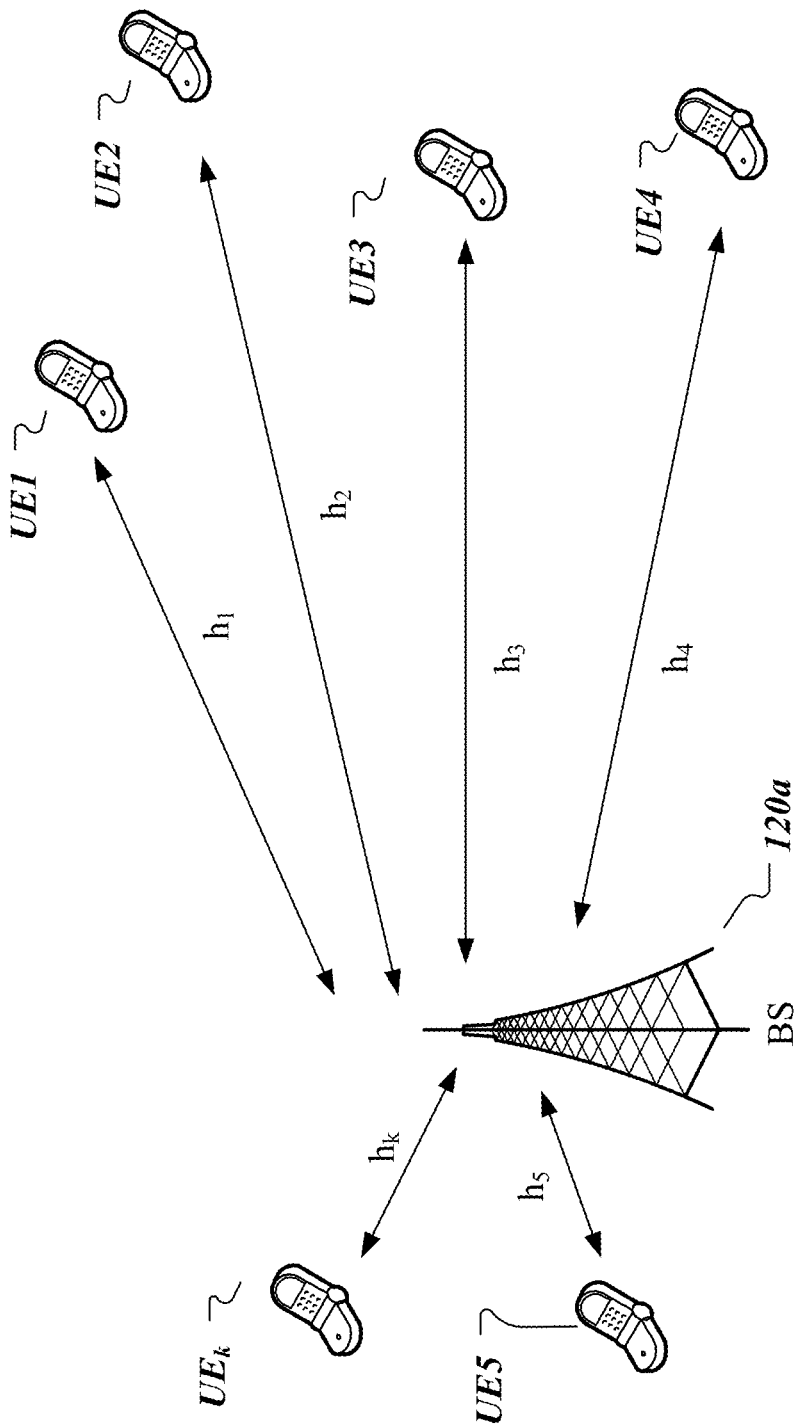
FIG. 1 shows a wireless communication network that includes several user devices.

In an affordable mMTC network deployment, at least the following two capabilities can be beneficial: (1) low-cost, power-saving devices and (2) support for massive infrequent small packets with reasonable spectrum. Autonomous Grant-Free (AGF) access technology allows transmission directly from idle state to simplify the transmitter side operation, and allows high overloading (HOL) capacity to enable wireless systems to accommodate massive sporadic small packets with reasonable spectrum. HOL of a wireless system can describe a situation where a number of UEs accessing the wireless system can be much larger than a length of spreading code. Thus AGF-HOL transmission combines the two desirable features described above that could be valuable for economic deployment of a mMTC network. However, the multi-user detection (MUD) achieving AGF-HOL can be challenging at least because significant blind detection efforts may be needed since the accessing information is unknown to the receiver, and the critical multiple access (MA) signature collision problem may worsen rapidly with the AGF loading.

AGF-HOL technology provides at least four potential discriminations among multiplexed UEs committing AGF transmissions and introduces blind MUD technology that can achieve AGF-HOL using a single receiver antenna. The four potential discriminations for distinguishing UEs can include power domain, code domain, spatial domain, and constellation domain. With the exception of spatial discrimination, current blind MUD technology has exploited three discriminations to achieve more than 300% AGF overloading. Simulation results have shown that about 600% and 1000% AGF overloading can be achieved by further exploiting the spatial discrimination afforded by two and four receiving antennas, respectively. With a blind MUD, the system loading of AGF can also be nearly linear increased with the number of receiving antenna as long as the spatial discrimination can be fully utilized. However, one problem with current AGF-HOL blind MUD technology is effective utilization of multiple receiving antennas.

This patent document discloses, among other things, embodiments that can achieve AGF-HOL with multiple receiving antennas. This patent document also discloses an exemplary blind MUD receiver that can combine the spatial discrimination with other discriminations, such as the power, code, and constellation discriminations, to realize AGF-HOL capacity in a wireless system. In some embodiments, AGF transmission without reference signal, also known as data-only AGF, can be used to provide one more discrimination than the discrimination(s) provided by an AGF transmission with reference signal (RS). Data-only AGF transmissions may include data that is spread using spreading codes. Using spatial discrimination can beneficially improve the system loading for AGF transmission with RS or a preamble, or for data-only AGF, or for other AGF transmission, such AGF based on differential encoding technique, or even for grant-based transmission.

In the description below, section headings are used only to facilitate the understanding of the disclosed subject matter and do not limit the scope of the claimed subject matter in any way.

In a wireless system that includes a mMTC network, a UE can transmit information using an automatic or grant-free mode when there is information to send, and the UE can go to a power-saving state, such as deep sleep state or idle state, when there is no information to transmit. A UE may be a machine-type communication device, such as surveillance cameras, vending machines, utility meters, wireless sensors, etc., When the UE sends data, it can send data directly from the idle state or the power-saving state without exchanging information with or requesting access from the base station to simplify the access process. In some implementations, a UE can choose an access signature, such as a demodulation reference signal (DMRS), a preamble, a spreading sequence or spreading code, a scrambling code, or an interleaver, and then the UE can process the information data with the access signature to generate and transmit a transmission data frame.

In some implementations, a UE can send the transmission data frame without a reference signal, which can be referred to as pure data mode or data-only mode. In some other implementations, the transmission data frame can be based on a DMRS-based transmission or a preamble-based transmission with reference signal. In yet other implementations, the transmission data frame can be based on differential encoding technique.

The transmitted code block bits include information generated and processed for the data frame, including the access signature information, that can be beneficial to the reconstruction and elimination of correctly decoded information in blind detection.

Examples of Problems of Traditional Spatial Approaches and Exemplary Solutions Based on Blind Spatial Combination (BSC) or Blind Receiving Beamforming (BRB)

Multiple receiving antennas can be exploited to harvest the spatial gains, for example, diversity gain or interference rejection gain, through suitable spatial combining (SC) or receiving beamforming (RBF).

FIG. 1 shows a wireless communication network that includes several UEs. In the example shown in FIG. 1, there are K number of UEs that access a base station (BS) or network node and each UE has one transmitting antenna. The spatial channel between the k UEs and the BS with M receiving antennas (not shown) is represented by $h_k$, where $h_k=[h_{k1}, h_{k2}, \ldots, h_{kM}]$. Conventional Match Filter (MF) combining or receiving beamforming for $UE_k$ first needs information about $h_k$. Further, Zero Forcing (ZF) and Minimum Mean Square Error (MMSE) combining or receiving beamforming for a particular $UE_k$ needs information about the other UEs' spatial channels besides the $h_k$ of a $UE_k$. To acquire the spatial channels $[h_{k1}, h_{k2}, \ldots, h_{kM}]$, conventional technology requires channel estimation to be performed separately at each BS receiving antenna, usually by using UE-specific RS or preamble, which can be made orthogonal in grant-based accessing.

In a conventional wireless system, suitable spatial combining of signals by a BS requires that the spatial channels of the accessing UEs be known to the BS prior to the combining or receiving beamforming of the signals. As a result, conventional wireless systems perform channel estimation at each BS receiving antenna separately without the diversity gain and interference rejection gain that are provided by the spatial combining. Accordingly, conventional wireless systems are sensitive to fading and interference. This sensitivity could be reduced by enhanced reference signal (RS) design or preamble design in grant-based accessing. As an example, RSs that are interference-free within the UEs and robust to the fading can be used at the expense of more overhead. However, in AGF access technology, where UEs can randomly select the access signatures including the RS and spreading code, uncontrollable collision of RS and spreading code can worsen significantly the channel estimation of RS-based AGF and data-only AGF, respectively, which can also worsen the performance of the BS's SC or RBF. Furthermore, an increased loading with an increased signature collision probability would makes the channel estimations difficult, thus reducing the system loading.

Figure 2:
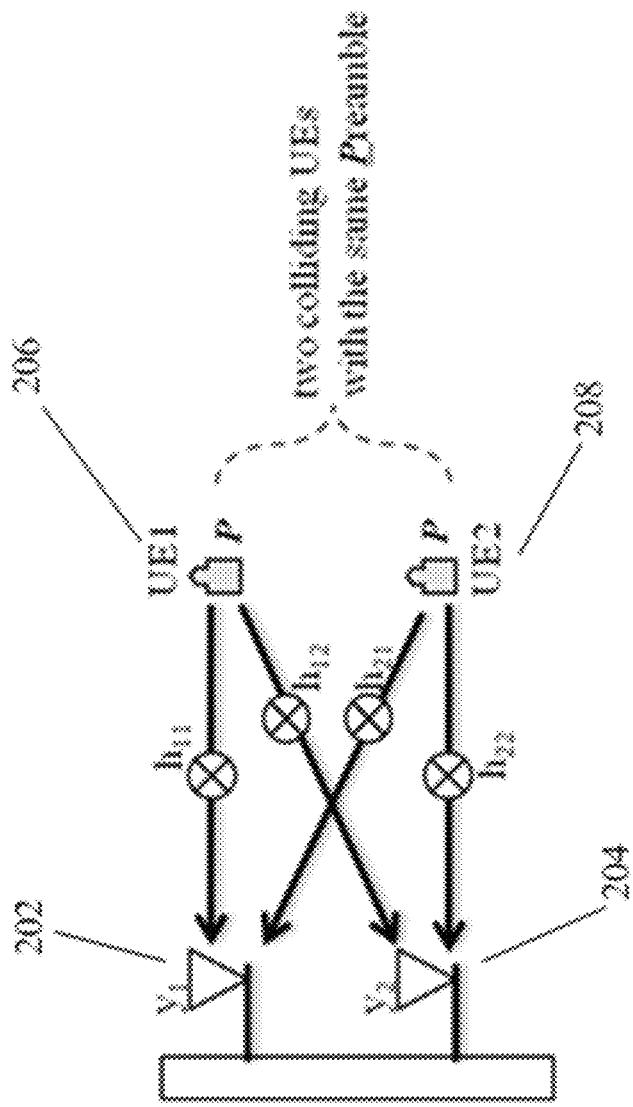
FIG. 2 shows an example of access signature collision affecting the channel estimation of a preamble-based Autonomous Grant-Free (AGF) data transmission.

FIG. 2 shows an example of access signature collision affecting the channel estimation of a preamble-based AGF transmission. FIG. 2 shows two receiving antennas 202, 204 in the BS and one transmitting antenna in each UE 206, 208. In the example shown in FIG. 2, UE1 206 and UE2 208 can select the same preamble P in preamble-based AGF accessing scheme. Equation (1) shows the receiving signals associated with preamble in the receiving antennas 202 and 204 at the BS as $y_1$ and $y_2$, respectively:

$$y_1 = P \cdot h_{11} + P \cdot h_{21} + n_1$$

$$y_2 = P \cdot h_{12} + P \cdot h_{22} + n_2 \qquad \text{Eq. (1)}$$

where P is the preamble, $h_{11}$, $h_{21}$, $h_{12}$, and $h_{22}$ represent the spatial channel between the UEs and the BS, and $n_1$ and $n_2$ represent noise. The channel estimated through $y_1$ is $h_{11}+h_{21}$ and channel estimated through $y_2$ is $h_{12}+h_{22}$. Thus, the BS performed spatial combining is biased at least because the BS uses the combined spatial channels.

While data-only AGF could provide more discrimination to handle collision than the discrimination provided by RS-based AGF, if the collision probability exceeds a certain level, the performance of data-only MUD would also suffer. Thus, if data-only MUD including blind estimating is just applied in each receiving antenna separately, the loading capacity may not exceed the level of single receiving antenna, since the spatial domain discrimination from multiple receiving antenna cannot be effectively exploited.

Figure 3:
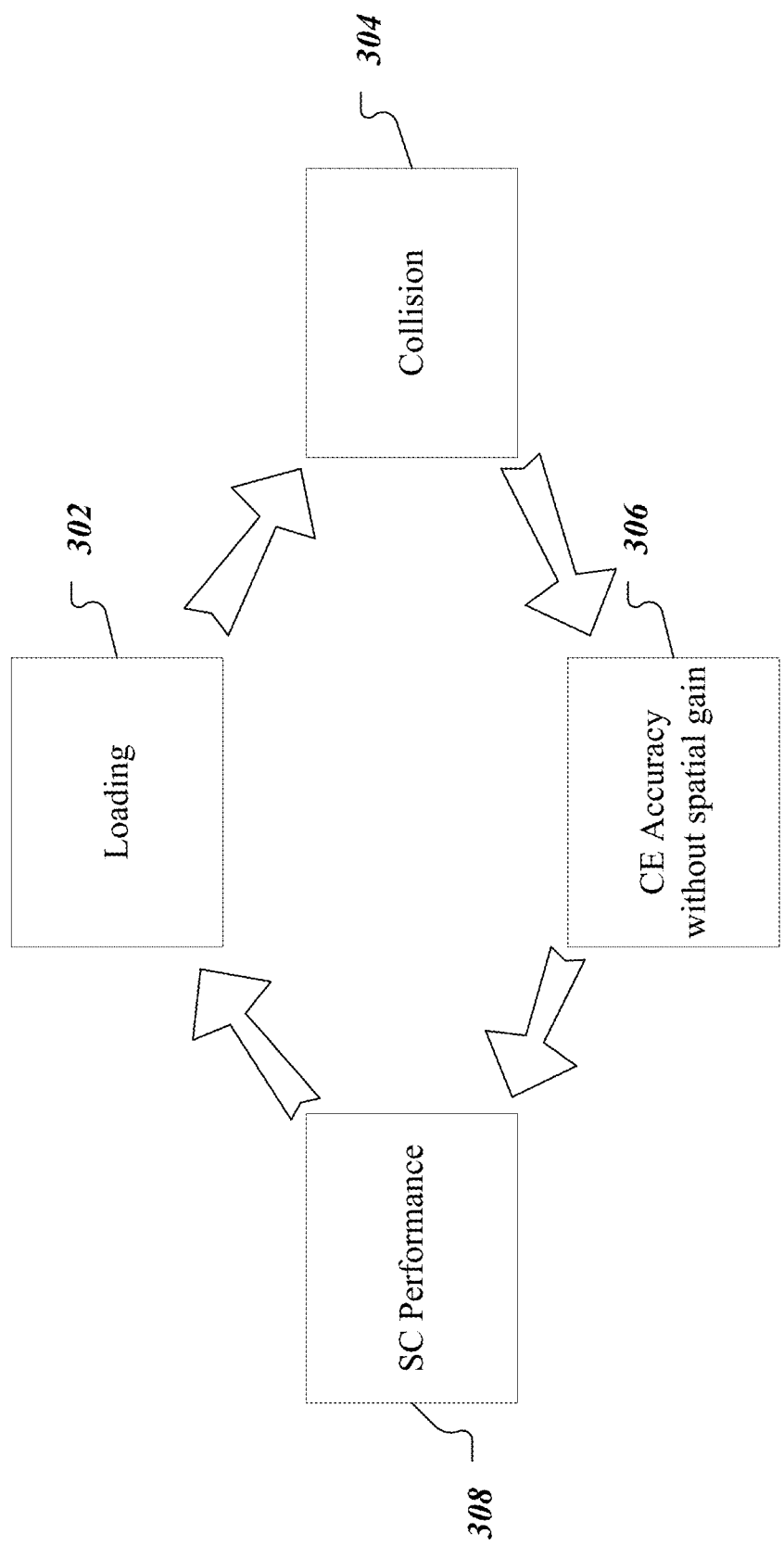
FIG. 3 illustrates the challenges associated with applying traditional spatial procedure applied to AGF high overloading (HOL) technology.

FIG. 3 illustrates examples of challenges associated with applying traditional spatial procedure applied to AGF-HOL technology. Traditional spatial technology (shown with clockwise dashed arrows) can be difficult to implement to provide effective spatial combining. In a traditional spatial technology, signals are loaded by transmitting devices for transmission 302, the transmitted signals can experience collision 304, the BS perform channel estimation without spatial gain information 306, and the BS performs spatial combining of the received signals according to the spatial channels 308. In a high collision situation in AGF-HOL, traditional spatial process of estimating the spatial channels first and then combining according to spatial channels can worsen the channel estimation accuracy without spatial combining gain information.

In some embodiments, the exemplary process can first combine the signals received at the receiving antennas and then estimate the channel or detect the information. A benefit of combining the signals first without spatial channels and then estimating the channel or detecting the information is that it can harvest the spatial combining gain as early to facilitate estimating of the channel or detecting information. A better estimating performance and higher loading are some of the benefits of the exemplary process. Thus, the exemplary process allows for blind MUD for AGF-HOL by performing of an effective SC or RBF without the UEs' spatial channels.

Figure 4:
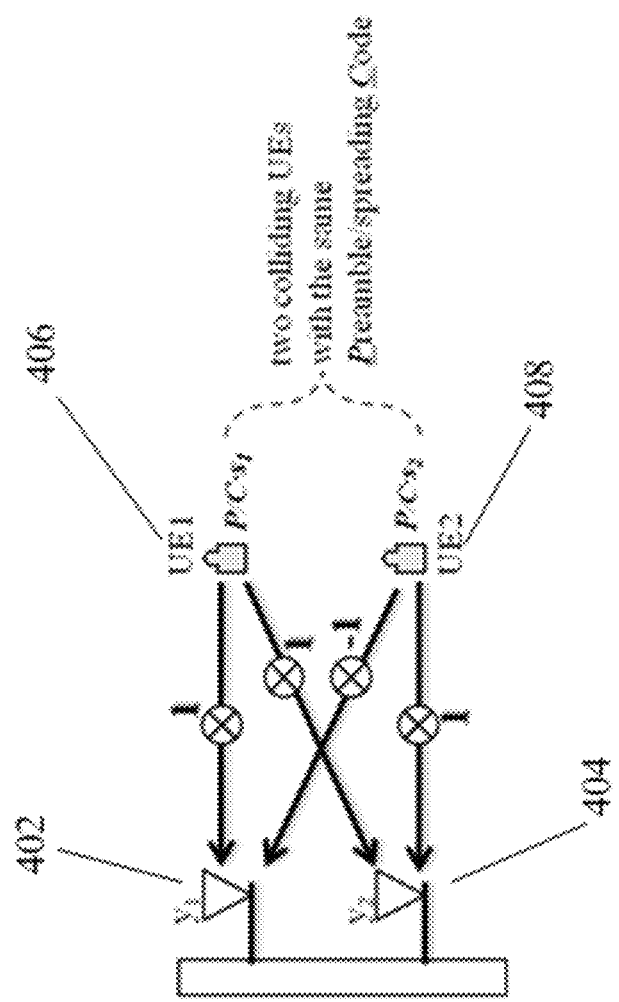
FIG. 4 shows an exemplary embodiment for performing effective spatial combining (SC) or receiving beamforming (RBF) in highly collision situation without the UEs' spatial channel information.

FIG. 4 shows an exemplary embodiment for performing effective SC or RBF in highly collision situation without the UEs' spatial channel information. FIG. 4 is similar to FIG. 2 with the exception of the specific value listed for spatial channel. The exemplary specific value of the spatial channels of UE1 406 and UE2 408 are h1=[11] and h2=[−11], respectively. The $(P/C \cdot s_1)$ and $(P/C \cdot s_2)$ represent preamble and/or data symbols $s_1$ and $s_2$ spread by the spreading code C. In some embodiments, the UEs can perform data-only accessing by just transmitting the spread data symbols $C \cdot s_1$ and $C \cdot s_2$ without adding any reference signal or preamble. In some embodiments, the spreading code C can be a W-length spreading code, for example, $C=[c_1, c_2, \ldots c_W]$, $s_1$ includes data symbols with N symbols, for example, $s_1=[s_{11}, s_{12}, \ldots$ $s_{1N}$]. Thus, in this example, $C \cdot s_1 = [s_{11}c_1, s_{11}c_2, \ldots s_{11}c_W, s_{12}c_1, s_{12}c_2, \ldots s_{12}c_W, \ldots s_{1N}c_1, s_{1N}c_2, \ldots s_{1N}c_W]$.

In preamble-based accessing, the two UEs' preamble can be cancelled out in antenna 1 402 since the channels of these two colliding preambles are opposite at antenna 1 402. Thus, at antenna 1 402 signals from $y_1$ cannot be used to estimate any information. In data-only accessing, the two UEs' spreading codes can be the same so that a collision occurs, which increases the blind MUD difficulty, even though the data symbol $s_1$ and $s_2$ are independent of each other.

In an exemplary embodiment, linear combinations can be pre-defined to obtain signals transmitted by the UE. Linear combinations such as $z_1 = (y_1 + y_2)$, and $z_2 = (y_1 - y_2)$ can be performed by a BS so that $z_1$ can include only UE1's signal, for example, UE1's preamble or spreading data, and $z_2$ can include only UE2's signal, such as UE2's preamble or spreading data. Thus, one benefit of using predefined linear combinations is that it can be used to separate collision effectively.

The exemplary pre-defined combinations can work without the spatial channel information and thus can be considered blind spatial combinations. Linear combinations can also be implemented by inner product of vectors. For example, the above two linear combinations can be described with the following two inner products: $z_1 = <v_1, y>$, and $z_2 = <v_2, y>$ or $z_1 = v_1 y$, and $z_2 = v_2 y$, where the combining vectors $v_1 = [1,1]$ and $v_2 = [1,-1]$, and where the received signal vectors can be described as $y = [y_1, y_2]$. These vectors can be described in complex $\mathbb{C}^m$ space, where m is the number of the receiving antennas. In some embodiments, two vectors are pre-defined for a base station or network node having two receiving antennas. In the example linear combinations shown above for $z_1$ and $z_2$, M equals to $_2$.

In some other embodiment, more than two vectors can be pre-defined to allow sufficient spanning in $\mathbb{C}^2$ space for two receiving antennas of the base station or the network node. In yet some other embodiment, a subset of the 6 vectors shown below can be used. Vectors that can sufficiently span $\mathbb{C}^2$ can be beneficial. In some embodiments, at most six pre-defined combining vectors can be used by a BS or network node to combine the receives signals. The six pre-defined combining vectors can include, for example, $v_1 = [1,1]$, $v_2 = [1,-1]$, $v_3 = [1,j]$, $v_4 = [1,-j]$, $v_5 = [1,0]$, $v_6 = [0,1]$. One benefit of using the six pre-defined combining vectors as described above is that they can have a good spanning over the $\mathbb{C}^2$ space. Another benefit of using the six pre-defined combining vectors as described above is that can have the simplest combining complexity in part because all elements in each vector come from the set $\{1, j, -1, -j, 0\}$ so that in some embodiments a base station or a network node need not perform multiplication in the spatial combining or inner products. Using these six pre-defined combining code, 600% AGF-HOL can be achieved by blind spatial combination. In yet other embodiments, four or twelve vectors can be pre-defined for a base station or a network node having two receiving antennas.

After the blind spatial combination, each combined stream can be viewed as a receiving symbol stream by single receiving antenna and further be applied blind de-spreading and blind equalization, as further described below. In some embodiments, after blind equalization, a number of highest signal-to-interference-plus-noise ratio (SINR) streams from a total number of streams can be provided to the decoder to decode the signals.

Figure 5:
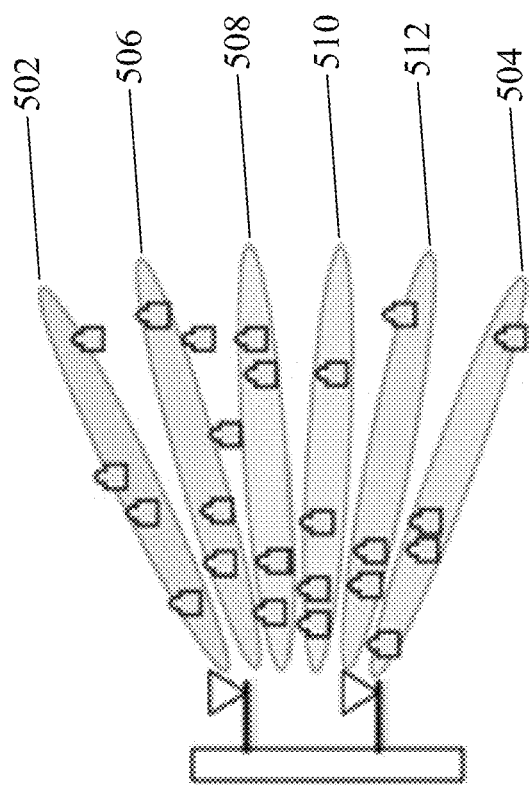
FIG. 5 shows an example of a BS and UEs using multiple spatial combining vectors.
Figure 5:
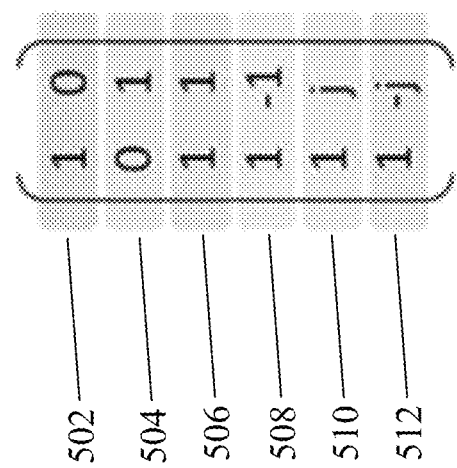

FIG. 5 shows an example of a BS and UEs using multiple spatial combining vectors. Spatial combining can be considered equivalent to receiving beamforming that can more clearly identify data streams from different UEs. As an example, six spatial combining vector $v_1 = [1,1]$, $v_2 = [1,-1]$, $v_3 = [1,j]$, $v_4 = [1,-j]$, $v_5 = [1,0]$, $v_6[0,1]$ (502, 504, 506, 508, 510, 512) can be considered as six receiving beams (502, 504, 506, 508, 510, 512). Thus, blind spatial combination can also be considered as blind receiving beamforming. In grant-free massive accessing scenarios, such as when UEs do not request scheduling grant resources from BS or receive scheduling grants from the BS, the receiving signal vectors of many randomly accessing UEs would randomly distributes in the spatial space $\mathbb{C}^m$. Further, in such grant-free massive accessing scenarios, a set of distributed receiving beams could cover all the receiving signal vectors as possible, and each beam may align some UEs and avoid other UEs. Thus, diversity gain and interference rejection gain can be statistically acquired by blind receiving beamforming with suitable pre-defined receiving beams or spatial combining vectors.

In some other embodiments, 12 vectors can be pre-defined to allow sufficient spanning in $\mathbb{C}^4$ space for four receiving antennas of the base station or the network node. Vectors that can sufficiently span $\mathbb{C}^4$ can be beneficial. In some embodiments, at most 12 pre-defined combining vectors can be used by a BS or network node to combine the receives signals. The 12 pre-defined combining vectors can include, for example, $v_1 = [1,1,0,0]$, $v_2 = [1,-1,0,0]$, $v_3 = [1,0,1,0]$, $v_4 = [1,0,-1,0]$, $v_5 = [1,0,0,1]$, $v_6 = [1,0,0,-1]$, $v_7 = [0,1,1,0]$, $v_8 = [0,1,-1,0]$, $v_9 = [0,1,0,1]$, $v_{10} = [0,1,0,-1]$, $v_{11} = [0,0,1,1,]$, $v_{12} = [0,0,1,-1]$.

One benefit of using these 12 pre-defined combining vectors as described above is that they can have a relative good spanning over the $\mathbb{C}^4$ space. Another benefit of using the 12 pre-defined combining vectors as described above is that can have the simplest combining complexity in part because all elements in each vector come from the set $\{1, -1, 0\}$ so that in some embodiments a base station or a network node need not perform multiplication between the combining vectors and the received signals.

In some other embodiment, 24 vectors can be pre-defined to allow sufficient spanning in $\mathbb{C}^4$ space for four receiving antennas of the base station or the network node. In yet some other embodiment, a subset of the 24 vectors shown below can be used. Vectors that can sufficiently span $\mathbb{C}^4$ can be beneficial. In some embodiments, at most 24 pre-defined combining vectors can be used by a BS or network node to combine the receives signals. The 24 pre-defined combining vectors can include, for example, $v = [1,1,0,0]$, $v_2 = [1,-1,0,0]$, $v_3 = [1,0,1,0]$, $v_4 = [1,0,-1,0]$, $v_5 = [1,0,0,1]$, $v_6 = [1,0,0,-1]$, $v_7 = [0,1,1,0]$, $v_8 = [0,1,-1,0]$, $v_9 = [0,1,0,1]$, $v_{10} = [0,1,0,-1]$, $v_{11} = [0,0,1,1]$, $v_{12} = [0,0,1,-1]$, $v_{13} = [1,j,0,0]$, $v_{14} = [1j,0,0]$, $v_{15} = [1,0,j,0]$, $v_{16} = [1,0,-j,0]$, $v_{17} = [1,0,0,j]$, $v_{18} = [1,0,0,-j]$, $v_{19} = [0,1,j,0]$, $v_{20} = [0,1,-j,0]$, $v_{21} = [0,1,0,j]$, $v_{22} = [0,1,0,-j]$, $v_{23} = [0,0,1,j]$, $v_{24} = [0,0,1,-j]$.

One benefit of using these 24 pre-defined combining vectors as described above is that they can have a relative good spanning over the $\mathbb{C}^4$ space. Another benefit of using the 24 pre-defined combining vectors as described above is that can have the simplest combining complexity in part because all elements in each vector comes from the set $\{1, j, -j, -1, 0\}$ so that in some embodiments a base station or a network node need not perform multiplication between the combining vectors and the received signals.

In some other embodiment, 16 vectors can be pre-defined to allow sufficient spanning in $\mathbb{C}^4$ space for four receiving antennas of the base station or the network node. In yet some other embodiment, a subset of the 16 vectors shown below can be used. Vectors that can sufficiently span $\mathbb{C}^4$ can be beneficial. In some embodiments, at most 16 pre-defined combining vectors can be used by a BS or network node to combine the receives signals. The 16 pre-defined combining vectors can include, for example, $v_1=[1,1,1,1]$, $v_2=[1,-1,1,-1]$, $v_3=[1,1,-1,-1]$, $v_4=[1,-1,-1,1]$, $v_5=[1,-j,j,1]$, $v_6=[1,j,j,-1]$, $v_7=[1,-j,-j,-1]$, $v_8=[1,j,-j,1]$, $v_9=[1,-1,-j,-j]$, $v_{10}=[1,1,-j,j]$, $v_{11}=[1,-1,j,j]$, $v_{12}=[1,1,j,-j]$, $v_{13}=[1,j,-1,j]$, $v_{14}=[1,-j,-1,-j]$, $v_{15}=[1,j,1,-j]$, $v_{16}=[1,-j,1,j]$.

One benefit of using these 16 pre-defined combining vectors as described above is that they can have a relative good spanning over the $\mathbb{C}^4$ space. Another benefit of using the 16 pre-defined combining vectors as described above is that can have the simplest combining complexity in part because all elements in each vector comes from the set $\{1, j, -j, -1\}$ so that in some embodiments a base station or a network node need not perform multiplication between the combining vectors and the received signals.

In some other embodiment, 64 vectors can be pre-defined to allow sufficient spanning in $\mathbb{C}^8$ space for eight receiving antennas of the base station or the network node. In yet some other embodiment, a subset of the 64 vectors shown below can be used. Vectors that can sufficiently span $\mathbb{C}^8$ can be beneficial. In some embodiments, at most 64 pre-defined combining vectors can be used by a BS or network node to combine the receives signals. The 64 pre-defined combining vectors can include, for example:

$v_1 = [1, 1, 1, 1, 1, 1, 1, 1]$
$v_2 = [1, -1, 1, -1, 1, -1, 1, -1]$
$v_3 = [1, 1, -1, -1, 1, 1, -1, -1]$
$v_4 = [1, -1, -1, 1, 1, -1, -1, 1]$
$v_5 = [1, 1, 1, 1, -1, -1, -1, -1]$
$v_6 = [1, -1, 1, -1, -1, 1, -1, 1]$
$v_7 = [1, 1, -1, -1, -1, -1, 1, 1]$
$v_8 = [1, -1, -1, 1, -1, 1, 1, -1]$
$v_9 = [1, -j, 1, -j, j, 1, -j, -1]$
$v_{10} = [1, j, 1, j, j, 1, -j, 1]$
$v_{11} = [1, -j, -1, j, j, 1, j, 1]$
$v_{12} = [1, j, -1, -j, j, 1, j, -1]$
$v_{13} = [1, -j, 1, -j, -j, -1, j, 1]$
$v_{14} = [1, j, 1, j, -j, 1, j, -1]$
$v_{15} = [1, -j, -1, j, -j, -1, -j, -1]$
$v_{16} = [1, j, -1, -j, -j, 1, -j, 1]$
$v_{17} = [1, -1, -j, j, j, j, -1, -1]$
$v_{18} = [1, 1, -j, -j, j, -j, -j, 1]$
$v_{19} = [1, -1, -j, j, j, j, 1, 1]$
$v_{20} = [1, 1, j, j, j, -j, 1, -1]$
$v_{21} = [1, -1, -j, j, -j, -j, 1, 1]$
$v_{22} = [1, 1, -j, -j, -j, j, 1, -1]$
$v_{23} = [1, -1, j, -j, -j, -j, -1, -1]$
$v_{24} = [1, 1, j, j, -j, j, -1, 1]$
$v_{25} = [1, j, -j, 1, 1, -j, -j, -1]$
$v_{26} = [1, -j, -j, -1, 1, j, -j, 1]$
$v_{27} = [1, j, j, -1, 1, -j, j, 1]$
$v_{28} = [1, -j, j, 1, 1, j, j, -1]$
$v_{29} = [1, j, -j, 1, -1, j, j, 1]$
$v_{30} = [1, -j, -j, -1, -1, -j, j, -1]$
$v_{31} = [1, j, j, -1, -1, j, -j, -1]$
$v_{32} = [1, -j, j, 1, -1, -j, -j, 1]$
$v_{33} = [1, 1, j, -j, -1, 1, j, j]$
$v_{34} = [1, -1, j, j, -1, -1, j, -j]$
$v_{35} = [1, 1, -j, j, -1, 1, -j, -j]$
$v_{36} = [1, -1, -j, -j, -1, -1, -j, j]$
$v_{37} = [1, 1, j, -j, 1, -1, -j, -j]$
$v_{38} = [1, -1, j, j, 1, 1, -j, j]$
$v_{39} = [1, 1, -j, j, 1, -1, j, j]$
$v_{40} = [1, -1, -j, -j, 1, 1, j, -j]$
$v_{41} = [1, -j, j, -1, -j, 1, 1, -j]$
$v_{42} = [1, j, j, 1, -j, -1, 1, j]$
$v_{43} = [1, -j, -j, 1, -j, 1, -1, j]$
$v_{44} = [1, j, -j, -1, -j, -1, -1, -j]$
$v_{45} = [1, -j, j, -1, j, -1, -1, j]$
$v_{46} = [1, j, j, 1, j, 1, -1, -j]$
$v_{47} = [1, -j, -j, 1, j, -1, 1, -j]$
$v_{48} = [1, j, -j, -1, j, 1, 1, j]$
$v_{49} = [1, -1, -1, -1, -j, j, j, j]$
$v_{50} = [1, 1, -1, 1, -j, -j, j, -j]$
$v_{51} = [1, -1, 1, 1, -j, j, -j, -j]$
$v_{52} = [1, 1, 1, -1, -j, -j, -j, j]$
$v_{53} = [1, -1, -1, -1, j, -j, -j, -j]$
$v_{54} = [1, 1, -1, 1, j, j, -j, j]$
$v_{55} = [1, -1, 1, 1, j, -j, j, j]$
$v_{56} = [1, 1, 1, -1, j, j, j, -j]$
$v_{57} = [1, j, -1, j, -1, -j, -1, j]$
$v_{58} = [1, -j, -1, -j, -1, j, -1, -j]$
$v_{59} = [1, j, 1, -j, -1, -j, 1, -j]$
$v_{60} = [1, -j, 1, j, -1, j, 1, j]$
$v_{61} = [1, j, -1, j, 1, j, 1, -j]$
$v_{62} = [1, -j, -1, -j, 1, -j, 1, j]$
$v_{63} = [1, j, 1, -j, 1, j, -1, j]$
$v_{64} = [1, -j, 1, j, 1, -j, -1, -j]$

One benefit of using these 64 pre-defined combining vectors as described above is that they can have a relative good spanning over the $\mathbb{C}^8$ space. Another benefit of using the 64 pre-defined combining vectors as described above is that can have the simplest combining complexity in part because all elements in each vector comes from the set $\{1, j, -j, -1\}$ so that in some embodiments a base station or a network node need not perform multiplication between the combining vectors and the received signals.

In some other embodiment, 24 vectors can be pre-defined to allow sufficient spanning in $\mathbb{C}^8$ space for eight receiving antennas of the base station or the network node. In yet some other embodiment, a subset of the 24 vectors shown below can be used. Vectors that can sufficiently span $\mathbb{C}^8$ can be beneficial. In some embodiments, at most 24 pre-defined combining vectors can be used by a BS or network node to combine the receives signals. The 24 pre-defined combining vectors can include, for example:

$v_1 = [1, 1, 1, 1, 0, 0, 0, 0]$,
$v_2 = [1, -1, 1, -1, 0, 0, 0, 0]$,
$v_3 = [1, 1, -1, -1, 0, 0, 0, 0]$,
$v_4 = [1, -1, -1, 1, 0, 0, 0, 0]$,
$v_5 = [0, 0, 0, 0, 1, 1, 1, 1]$,
$v_6 = [0, 0, 0, 0, 1, -1, 1, -1]$,
$v_7 = [0, 0, 0, 0, 1, 1, -1, -1]$,
$v_8 = [0, 0, 0, 0, 1, -1, -1, 1]$,
$v_9 = [0, 0, 1, 1, 1, 1, 0, 0]$,
$v_{10} = [0, 0, 1, -1, 1, -1, 0, 0]$,
$v_{11} = [0, 0, 1, 1, -1, -1, 0, 0]$,
$v_{12} = [0, 0, 1, -1, -1, 1, 0, 0]$,
$v_{13} = [1, 1, 0, 0, 0, 0, 1, 1]$,
$v_{14} = [1, -1, 0, 0, 0, 0, 1, -1]$,
$v_{15} = [1, 1, 0, 0, 0, 0, -1, -1]$,
$v_{16} = [1, -1, 0, 0, 0, 0, -1, 1]$,
$v_{17} = [0, 0, 1, 1, 0, 0, 1, 1]$,
$v_{18} = [0, 0, 1, -1, 0, 0, 1, -1]$,
$v_{19} = [0, 0, 1, 1, 0, 0, -1, -1]$,
$v_{20} = [0, 0, 1, -1, 0, 0, -1, 1]$,
$v_{21} = [1, 1, 0, 0, 1, 1, 0, 0]$,
$v_{22} = [1, -1, 0, 0, 1, -1, 0, 0]$,
$v_{23} = [1, 1, 0, 0, -1, -1, 0, 0]$,
$v_{24} = [1, -1, 0, 0, -1, 1, 0, 0]$

One benefit of using these 24 pre-defined combining vectors as described above is that they can have a relative good spanning over the $\mathbb{C}^8$ space. Another benefit of using the 24 pre-defined combining vectors as described above is that can have the simplest combining complexity in part because all elements in each vector come from the set $\{1, -1, 0\}$ so that in some embodiments a base station or a network node need not perform multiplication between the combining vectors and the received signals.

In some other embodiment, 96 vectors can be pre-defined to allow sufficient spanning in $\mathbb{C}^8$ space for eight receiving antennas of the base station or the network node. In yet some other embodiment, a subset of the 96 vectors shown below can be used. Vectors that can sufficiently span $\mathbb{C}^8$ can be beneficial. In some embodiments, at most 96 pre-defined combining vectors can be used by a BS or network node to combine the receives signals. The 96 pre-defined combining vectors can include, for example:

$v_1 = [1, 1, 1, 1, 0, 0, 0, 0]$,
$v_2 = [1, -1, 1, -1, 0, 0, 0, 0]$,
$v_3 = [1, 1, -1, -1, 0, 0, 0, 0]$,
$v_4 = [1, -1, -1, 1, 0, 0, 0, 0]$,
$v_5 = [1, -j, j, 1, 0, 0, 0, 0]$,
$v_6 = [1, j, j, -1, 0, 0, 0, 0]$,
$v_7 = [1, -j, -j, -1, 0, 0, 0, 0]$,
$v_8 = [1, j, -j, 1, 0, 0, 0, 0]$,
$v_9 = [1, -1, -j, -j, 0, 0, 0, 0]$,
$v_{10} = [1, 1, -j, j, 0, 0, 0, 0]$,
$v_{11} = [1, -1, j, j, 0, 0, 0, 0]$,
$v_{12} = [1, 1, j, -j, 0, 0, 0, 0]$,
$v_{13} = [1, j, -1, j, 0, 0, 0, 0]$,
$v_{14} = [1, -j, -1, -j, 0, 0, 0, 0]$,
$v_{15} = [1, j, 1, -j, 0, 0, 0, 0]$,
$v_{16} = [1, -j, 1, j, 0, 0, 0, 0]$,
$v_{17} = [0, 0, 0, 0, 1, 1, 1, 1]$,
$v_{18} = [0, 0, 0, 0, 1, -1, 1, -1]$,
$v_{19} = [0, 0, 0, 0, 1, 1, -1, -1]$,
$v_{20} = [0, 0, 0, 0, 1, -1, -1, 1]$,
$v_{21} = [0, 0, 0, 0, 1, -j, j, 1]$,
$v_{22} = [0, 0, 0, 0, 1, j, j, -1]$,
$v_{23} = [0, 0, 0, 0, 1, -j, -j, -1]$,
$v_{24} = [0, 0, 0, 0, 1, j, -j, 1]$,
$v_{25} = [0, 0, 0, 0, 1, -1, -j, -j]$,
$v_{26} = [0, 0, 0, 0, 1, 1, -j, j]$,
$v_{27} = [0, 0, 0, 0, 1, -1, j, j]$,
$v_{28} = [0, 0, 0, 0, 1, 1, j, -j]$,
$v_{29} = [0, 0, 0, 0, 1, j, -1, j]$,
$v_{30} = [0, 0, 0, 0, 1, -j, -1, -j]$,
$v_{31} = [0, 0, 0, 0, 1, j, 1, -j]$,
$v_{32} = [0, 0, 0, 0, 1, -j, 1, j]$,
$v_{33} = [0, 0, 1, 1, 1, 1, 0, 0]$,
$v_{34} = [0, 0, 1, -1, 1, -1, 0, 0]$,
$v_{35} = [0, 0, 1, 1, -1, -1, 0, 0]$,
$v_{36} = [0, 0, 1, -1, -1, 1, 0, 0]$,
$v_{37} = [0, 0, 1, -j, j, 1, 0, 0]$,
$v_{38} = [0, 0, 1, j, j, -1, 0, 0]$,
$v_{39} = [0, 0, 1, -j, -j, -1, 0, 0]$,
$v_{40} = [0, 0, 1, j, -j, 1, 0, 0]$,
$v_{41} = [0, 0, 1, -1, -j, -j, 0, 0]$,
$v_{42} = [0, 0, 1, 1, -j, j, 0, 0]$,
$v_{43} = [0, 0, 1, -1, j, j, 0, 0]$,
$v_{44} = [0, 0, 1, 1, j, -j, 0, 0]$,
$v_{45} = [0, 0, 1, j, -1, j, 0, 0]$,
$v_{46} = [0, 0, 1, -j, -1, -j, 0, 0]$,
$v_{47} = [0, 0, 1, j, 1, -j, 0, 0]$,
$v_{48} = [0, 0, 1, -j, 1, j, 0, 0]$,
$v_{49} = [1, 1, 0, 0, 0, 0, 1, 1]$,
$v_{50} = [1, -1, 0, 0, 0, 0, 1, -1]$,
$v_{51} = [1, 1, 0, 0, 0, 0, -1, -1]$,
$v_{52} = [1, -1, 0, 0, 0, 0, -1, 1]$,
$v_{53} = [1, -j, 0, 0, 0, 0, j, 1]$,
$v_{54} = [1, j, 0, 0, 0, 0, j, -1]$,
$v_{55} = [1, -j, 0, 0, 0, 0, -j, -1]$,
$v_{56} = [1, j, 0, 0, 0, 0, -j, 1]$,
$v_{57} = [1, -1, 0, 0, 0, 0, -j, -j]$,
$v_{58} = [1, 1, 0, 0, 0, 0, -j, j]$,
$v_{59} = [1, -1, 0, 0, 0, 0, j, j]$,
$v_{60} = [1, 1, 0, 0, 0, 0, j, -j]$,
$v_{61} = [1, j, 0, 0, 0, 0, -1, j]$,
$v_{62} = [1, -j, 0, 0, 0, 0, -1, -j]$,
$v_{63} = [1, j, 0, 0, 0, 0, 1, -j]$,
$v_{64} = [1, -j, 0, 0, 0, 0, 1, j]$,
$v_{65} = [0, 0, 1, 1, 0, 0, 1, 1]$,
$v_{66} = [0, 0, 1, -1, 0, 0, 1, -1]$,
$v_{67} = [0, 0, 1, 1, 0, 0, -1, -1]$,
$v_{68} = [0, 0, 1, -1, 0, 0, -1, 1]$,
$v_{69} = [0, 0, 1, -j, 0, 0, j, 1]$,
$v_{70} = [0, 0, 1, j, 0, 0, j, -1]$,
$v_{71} = [0, 0, 1, -j, 0, 0, -j, -1]$,
$v_{72} = [0, 0, 1, j, 0, 0, -j, 1]$,
$v_{73} = [0, 0, 1, -1, 0, 0, -j, -j]$,
$v_{74} = [0, 0, 1, 1, 0, 0, -j, j]$,
$v_{75} = [0, 0, 1, -1, 0, 0, j, j]$,
$v_{76} = [0, 0, 1, 1, 0, 0, j, -j]$,
$v_{77} = [0, 0, 1, j, 0, 0, -1, j]$,
$v_{78} = [0, 0, 1, -j, 0, 0, -1, -j]$,
$v_{79} = [0, 0, 1, j, 0, 0, 1, -j]$,
$v_{80} = [0, 0, 1, -j, 0, 0, 1, j]$,
$v_{81} = [1, 1, 0, 0, 1, 1, 0, 0]$,
$v_{82} = [1, -1, 0, 0, 1, -1, 0, 0]$,
$v_{83} = [1, 1, 0, 0, -1, -1, 0, 0]$,
$v_{84} = [1, -1, 0, 0, -1, 1, 0, 0]$,
$v_{85} = [1, -j, 0, 0, j, 1, 0, 0]$,
$v_{86} = [1, j, 0, 0, j, -1, 0, 0]$,
$v_{87} = [1, -j, 0, 0, -j, -1, 0, 0]$,
$v_{88} = [1, j, 0, 0, -j, 1, 0, 0]$,
$v_{89} = [1, -1, 0, 0, -j, -j, 0, 0]$,
$v_{90} = [1, 1, 0, 0, -j, j, 0, 0]$,
$v_{91} = [1, -1, 0, 0, j, j, 0, 0]$,
$v_{92} = [1, 1, 0, 0, j, -j, 0, 0]$,
$v_{93} = [1, j, 0, 0, -1, j, 0, 0]$,
$v_{94} = [1, -j, 0, 0, -1, -j, 0, 0]$,
$v_{95} = [1, j, 0, 0, 1, -j, 0, 0]$,
$v_{96} = [-1, -j, 0, 0, 1, j, 0, 0]$

One benefit of using these 96 pre-defined combining vectors as described above is that they can have a relative good spanning over the $\mathbb{C}^8$ space. Another benefit of using the 96 pre-defined combining vectors as described above is that can have the simplest combining complexity in part because all elements in each vector come from the set $\{1, j, -1, -j, 0\}$ so that in some embodiments a base station or a network node need not perform multiplication between the combining vectors and the received signals.

In some embodiments, the vectors can have elements that can be selected from a set $\{1+j, 1-j, -1+j, -1-j, 0\}$, or a set $\{1+j, 1-j, -1+j, -1-j\}$.

An Exemplary Simplified Method for Blind Spatial Combination (BSC) or Blind Receiving Beamforming (BRB)

Blind receiving beamforming can significantly improve the overloading of AGF accessing but at the expense of increasing complexity. The number of beams used a wireless system can increase the complexity of performing, after combining of signals, blind detection such as blind de-spreading and blind equalization compared to blind de-spreading and blind equalization performed for single receiving antenna case. For example, if 64 spreading codes are used for AGF related transmission to a single receiving antenna, the direct blind MUD may exhaustively test 64 de-spreading and then 64 blind equalizations for the de-spreaded streams are needed. As another example, if two receiving antennas are deployed and 6 blind spatial combinations or receiving beams are pre-defined to be used before the detection, then direct blind MUD needs to perform at every combined signal stream, and therefore perform 64*6 de-spreading and then 64*6 blind equalization operations for the de-spreaded streams. Thus, in the example described above, a multiple receiver antenna performs six times the blind detection effort which can be a computational burden on the receiver.

An activity detection metric for single antenna can narrow down the blind range as early as possible using, for example, Equation (2), that can reduce computational complexity. Using Equation (2), a ⅞ reduction of blind de-spreading and blind equalization can be achieved.

$$\underset{k\,set}{\operatorname{argmin}} |c_k^* R_y^{-1} c_k| \qquad \text{Eq. (2)}$$

where $c_k$ is the k-th spreading code of the spreading code set and is a column vector, $c_k^*$ is a complex conjugate of $c_k$, further all the spreading code in the code set are W-length, $R_y=E(yy^*)$ is the correlation matrix of the combined spread symbol y. Therefore $R_y$ is a W*W matrix. Thus, blind MUD receiver integrated the blind receiving beamforming with the activity detection metric can be reasonable.

One implementation includes the BS performing pre-defined combining first, as described above, and can then apply the metric of Equation (2) in each combined stream to narrow down the de-spreading and equalization computations to a manageable range. For example, if 6 pre-defined combining are performed first by a BS, the BS can apply Equation (2) to narrows down the size of the spread code set that can be tested in the blind detection from 64 to 8, where the blind detection is performed after the combining of signals using the pre-defined combining vectors. Thus, the receiving antenna can perform 6*8=48 de-spreading and equalization operations instead of 64*6=384 de-spreading and equalizations operations.

After the de-spreading and equalization operations a predetermined subset of equalized streams can be selected to be decoded. As an example, four equalized streams having four largest SINR values can be picked to demodulate and decode the information bits. After some of the four equalized streams with the largest SINR are decoded correctly, the reconstructed symbols from the correctly decoded bits can be used to acquire the channel estimation as the pilot, thus, the reconstructed symbols can be considered data-pilot. Channel estimation obtained through data-pilot can be accurate enough at least because the transmit data symbols from diverse UEs or nodes are independent. In this way, the interference coming from these correctly decoded signals can be cancelled. The procedure of decoding and subtracting successively is a beneficial characteristic of a codeword-level SIC (CL-SIC) receiver that can be implemented on a network node. Since the reconstruction or regeneration of the transmission signal from the correctly decoded bits may have some ambiguity in AGF accessing, for example, the sequence used to de-spread the successfully decoded stream may not be that originally selected by the UE. This biases the reconstructed symbols and could consequently degrade the performance of the succeeding UEs. It could be solved by containing the sequence information into transmission signal. That can be generalized as the information of how the transmission signal is generated can be included in the transmission signal. For example, spreading sequence information, or scrambling code information, or interleaver information, or differential encoding information can be used to determine how the transmission signal is generated. With such information, accurate reconstruction or re-generation of the transmission signal and further best interference cancellation can be achieved.

In another implementation, a metric suitable for two antennas can be used by a BS to narrow down the size of the spread code set that can be tested as part of blind detection that is performed after the combining of signals, and then perform pre-defined combining for the selected spreading codes. For example, as shown below, a receiver can use Equation (3) to narrow down the size of the spread code set that can be tested in the blind detection from 64 to 8 first, and then 6 pre-defined combining for the selected 8 spreading codes can be performed. Thus, the receiving antenna can perform only 8*6=48 de-spreading and equalization operations instead of 64*6=384 de-spreading and equalizations operations.

One such metric for two antennas can be as shown below in Equation (3):

$$M_k = \underset{k\,set}{\operatorname{argmin}} \left\{ \begin{bmatrix} c_k^* & 0_W^* \\ 0_W^* & c_k^* \end{bmatrix} R_y^{-1} \begin{bmatrix} c_k & 0_W \\ 0_W & c_k \end{bmatrix} \right\} \qquad \text{Eq. (3)}$$

where $c_k$ is the kth spreading code of the spreading code set and is a column vector, $c_k^*$ is a complex conjugate of $c_k$, further all the spreading code in the code set are W-length and $0_W$ is W 0's column vector and $R_y=E(yy^*)$ is the correlation matrix of the receiving spread symbol of the two antennas therefore $R_y$ is a 2W*2W matrix, finally $M_k$ is a 2*2 complex symmetric matrix. The eigenvalues of $M_k$ $\lambda_1$ $\lambda_2$ can be found so that $$\begin{bmatrix} \lambda_1 \\ \lambda_2 \end{bmatrix} = eig(M_k).$$

Next, the value of $D_k$ can be obtained from Equation (4):

$$D_k = \frac{1}{|\lambda_{k1}|^a} + \frac{1}{|\lambda_{k2}|^a} \qquad \text{Eq. (4)}$$

where a=1 or 2 or another number. Using Equation (4), $D_k$ can be sorted to find the largest value corresponding to the sequence, for example, 8 or 12. Next, eight sequences can be used with the six pre-defined combinations to get a total of 48 streams to do blind detection, such as blind de-spreading and blind equalization, and calculate 48 SINR of the equalized symbol stream. Then, as an example, four equalized streams having four largest SINR values can be picked to demodulate and decode the information bits. As discussed above, the selected equalized streams can be further processed to obtain the reconstructed symbols to perform channel estimation.

Figure 6:
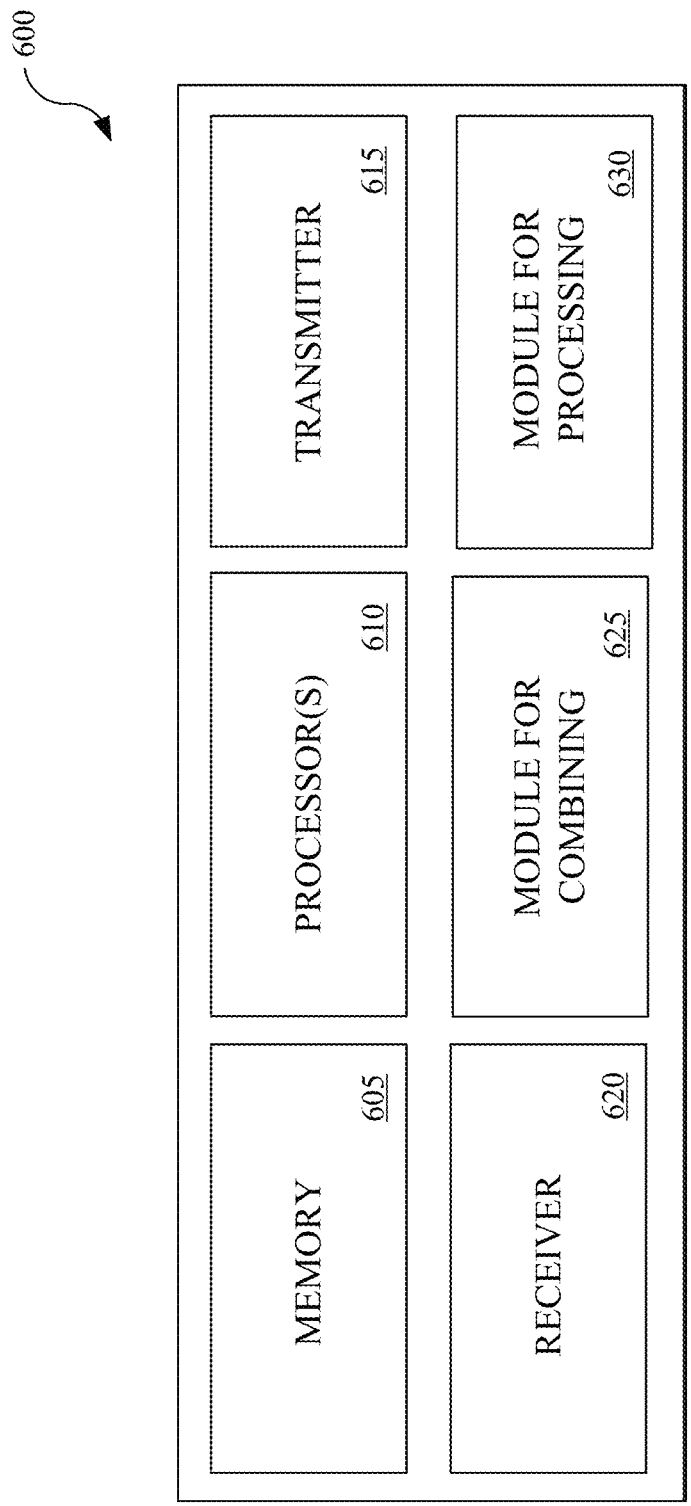
FIG. 6 shows a block diagram for an exemplary network node.

FIG. 6 shows a block diagram for an exemplary base station or network node to implement the combining, blind de-spreading, blind equalization, and decoding operations as described in this patent document. The network node 600 includes one or more processors 610 that can read code from the memory 605, and perform operations associated with the other blocks of the network node 600. The network node includes a transmitter 615 that can transmit data or control information to the UEs. The network node also includes receivers 620 associated with each antenna that can receive signals from the UEs. The module for combining 625 can combine the signals received at each receive antenna of the network node based on vectors from a pre-defined set of vectors, as described in this patent document. The module for processing 630 can process the combined signals to obtain an estimate of the signals as further described in this patent document. In some embodiments, the module for processing 630 can de-spread each combined signal, perform equalization on each de-spread signal, and decode a sub-set of equalized signals selected based on SINR values. In some embodiments, the module for processing 630 can de-scramble each combined signal, perform equalization on each de-scrambled signal, and decode a sub-set of equalized signals selected based on SINR values. In some embodiments, the module for processing 630 can perform de-interleaving on each combined signal, perform equalization on each de-interleaved signal, and decode a sub-set of equalized signals selected based on SINR values. In some embodiments, the module for processing 630 can perform differential decoding on each combined signal, perform equalization on each differential decoded signal, and decode a sub-set of equalized signals selected based on SINR values.

Figure 7:
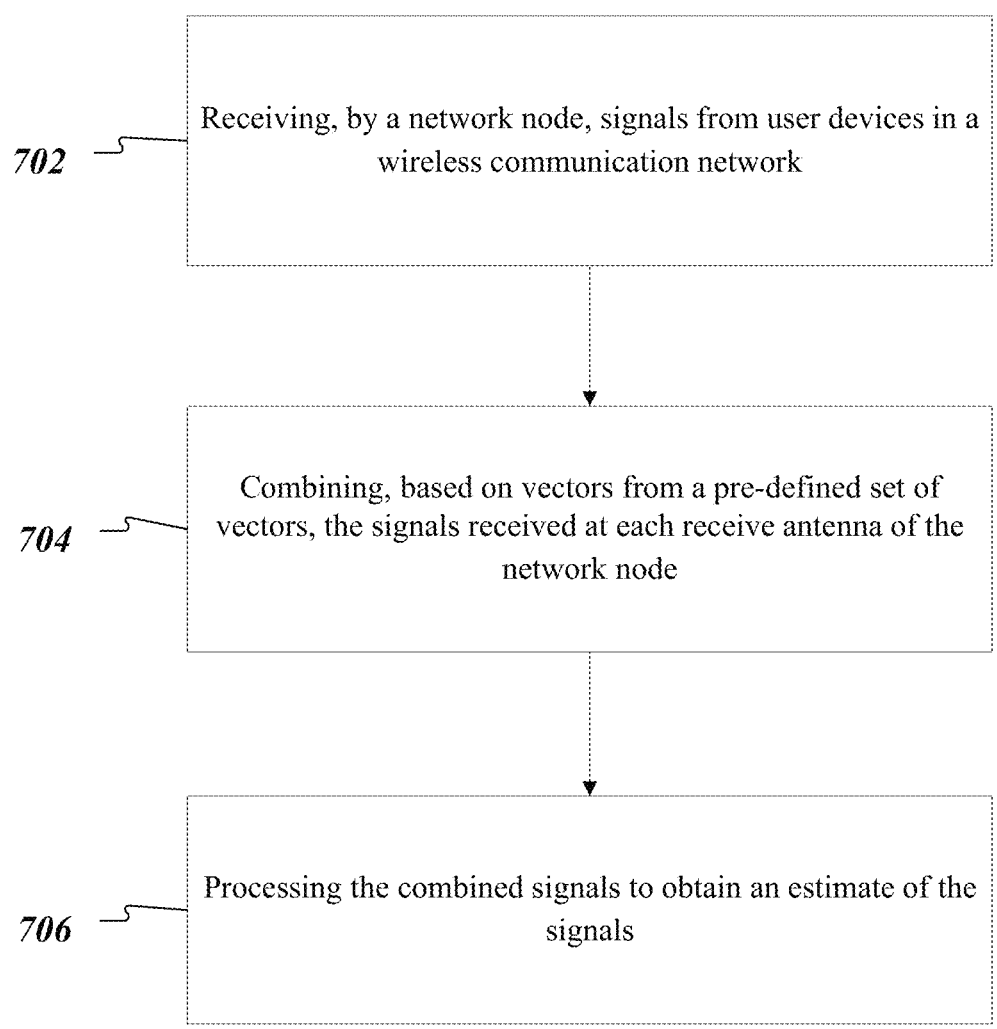
FIG. 7 shows an exemplary flowchart for a network node to process signals received from UEs.

FIG. 7 shows an exemplary flowchart for a network node to process signals received from UEs. At the receiving operation 702, a network node receives signals from user devices in a wireless communication network. In some embodiments, the wireless communication network can includes a massive Machine-type communication (mMTC) network and wherein the user devices comprise machine-type communication devices. In some embodiments, the signals can be received at the receiving operation 702 without a prior scheduling grant for the signals by the network node. In some embodiments, the received signals can include reference signals as described in this patent document.

At the combining operation 702, the signals received at each receive antenna of the network node are combined based on vectors from a pre-defined set of vectors. In an exemplary embodiment, each vector can correspond to a code having a length equal to a number of receive antennas of the network node. In some embodiments, the signals can be combined by multiplying each vector with the signals received at each receive antenna to obtain a set of combined signals. In some other embodiments, the signals can be combined by weighting the signals received at an m-th receive antenna with an m-th code of each vector, and then summing the weighted signals to obtain the combined signals.

At the processing operation 706, the combined signals are processed to obtain an estimate of the signals. In some embodiments, the processing of the combined signals can include de-spreading, performing equalization, and decoding by selecting a subset of equalized signals based on SINR values. Each combined signal can be de-spread using each spreading code from a set of pre-determined spreading codes. Equalization can be performed on each de-spread combined signal to obtain a set of equalized combined signals. A subset of equalized combined signals can be selected based on signal-to-interference-plus-noise ratio (SINR) values. The selected equalized combined signals can be decoded to obtain the estimate of the signals received from the user devices.

In some embodiments, the processing operation 706 may include a de-scrambling, equalization, and decoding operations. In such embodiments, each combined signal can be de-scrambled using each scrambling code from a set of pre-determined scrambling codes. Next, equalization can be performed on each de-scrambled combined signal to obtain a set of equalized combined signals. A subset of equalized combined signals can be selected based on signal-to-interference-plus-noise ratio (SINR) values. The selected equalized combined signals can be decoded to obtain the estimate of information bits received from the user devices.

In some other embodiments, the processing operation 706 may include a de-interleaving, equalization, and decoding operations. In such embodiments, each combined signal can be de-interleaved using each interleaver from a set of pre-determined interleavers. Next, equalization can be performed on each de-interleaved combined signal to obtain a set of equalized combined signals. A subset of equalized combined signals can be selected based on signal-to-interference-plus-noise ratio (SINR) values. The selected equalized combined signals can be decoded to obtain the estimate of information bits received from the user devices.

In yet some other embodiments, the processing operation 706 may include a differential decoding and decoding operations. In such embodiments, differential decoding can be performed each combined signal. Next, a subset of the differential decoded combined signals can be selected based on signal-to-interference-plus-noise ratio (SINR) values. The selected differential decoded combined signals can be decoded to obtain the estimate of information bits received from the user devices. In some embodiments where the received signals include reference signals, the processing operation 703 may include channel estimation, equalization, and decoding operations. A combined channel can be estimated by using the reference signals in each combined signal. Next, a subset of combined signals can be selected based on the channel estimation values. In some embodiments, channel estimation values can be for each of the combined signals using the reference signals, and then a subset of the combined signals can be selected based on the channel estimation values. Equalization can be performed on each of the subset of combined signals using its channel estimation value to obtain a set of equalized combined signals. The equalized combined signals can be decoded to obtain information bits of the signals received from the user devices.

In some embodiments, a combined channel can be estimated by using the reference signals in each combined signal, and then the combined signals can be processed by using a previous estimate of the combined channel.

Figure 8:
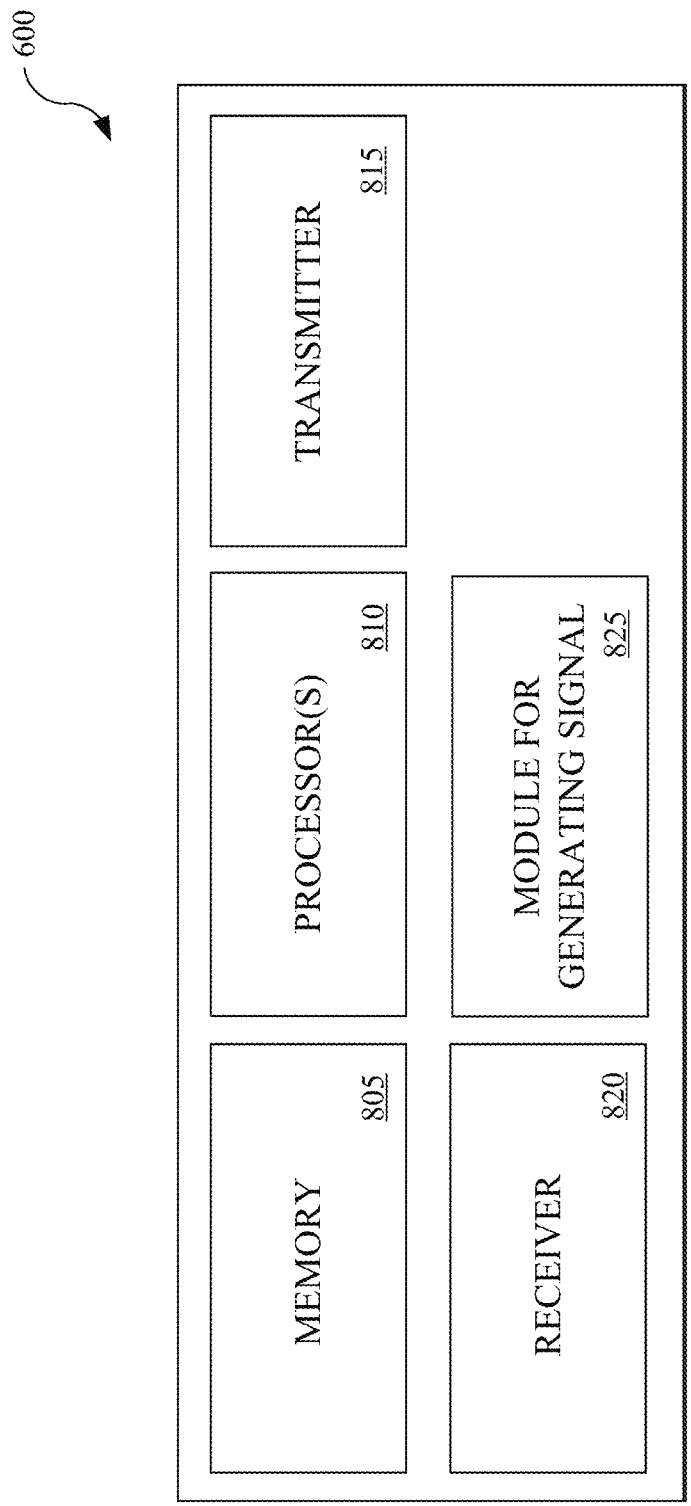
FIG. 8 shows a block diagram for an exemplary user device.

FIG. 8 shows a block diagram for an exemplary user device to implement the signal generation and transmission operations described in this patent document. The user device 800 includes one or more processors 810 that can read code from the memory 805, and perform operations associated with the other blocks of the user device 800. The user device includes a transmitter 815 that can transmit signals as part of AGF access technology as described in this patent document. The user device also includes a receiver 820 that can receive signals from the network node. The module for generating signals 825 can generate a transmission signal that includes data that can be spread based on a spreading code, as described in this patent document.

Figure 9:
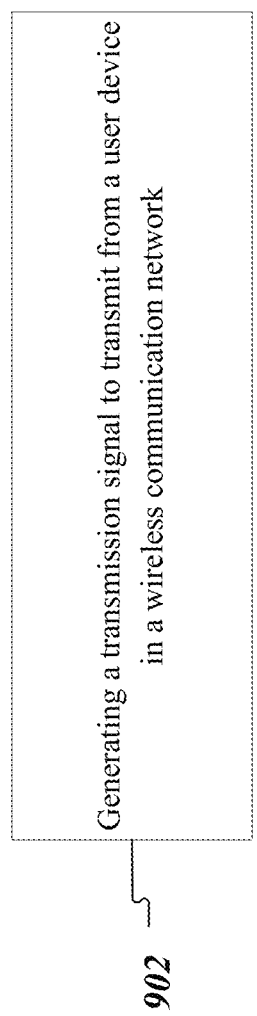
FIG. 9 shows an exemplary flowchart for a user device to generate a transmission signal.

FIG. 9 shows an exemplary flowchart for a user device to generate a transmission signal. At the generating operation 902, the user device generates a transmission signal to transmit from a user device in a wireless communication network. The transmission signal can include data for processing by vectors from a set of pre-defined vectors. In some embodiments, the data can be spread by the user device using a spreading code. The user device can transmit the transmission signal using an unscheduled transmission resource. In some embodiments, a transmission signal can include a reference signal as described in this patent document.

The term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments, modules and blocks can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
receiving, by a network node, signals from user devices in a wireless communication network;
obtaining combined signals by combining, based on vectors from a pre-defined set of vectors, the signals received by the network node; and
processing the combined signals to obtain an estimate of the signals, wherein the processing of the combined signals comprises:
de-spreading each combined signal using each spreading code from a set of pre-determined spreading codes;
performing equalization on each de-spread combined signal to obtain a set of equalized combined signals;
selecting a subset of equalized combined signals based on signal-to-interference-plus-noise ratio (SINR) values; and
decoding the selected equalized combined signals to obtain the estimate of information bits received from the user devices.

2. The wireless communication method of claim 1, wherein each vector corresponds to a code having a length equal to a number of receive antennas of the network node.

3. The wireless communication method of claim 1, wherein the combining the signals comprises:
determining a weighted sum of the signals received from a plurality of receive antennas of the network node by a corresponding code of each vector.

4. The wireless communication method of claim 1, wherein the processing of the combined signals comprises:
performing differential decoding on each combined signal;
selecting a subset of differential decoded combined signals based on signal-to-interference-plus-noise ratio (SINR) values; and
decoding the selected differential decoded combined signals to obtain the estimate of information bits received from the user devices.

5. The wireless communication method of claim 1,
wherein the signals include reference signals, and
wherein the processing of the combined signals comprises:
estimating a combined channel by using the reference signals in each combined signal; and
processing the combined signals using a previous estimate of the combined channel.

6. A wireless communication method, comprising:
generating a transmission signal to transmit from a user device in a wireless communication network,
wherein the transmission signal includes data for processing by vectors from a set of pre-defined vectors,
wherein the transmission signal is generated using an access signature selected by the user device,
wherein the transmission signal is transmitted using a grant free transmission technique,
wherein the transmission signal includes data that is spread using a spreading code, scrambled using a scrambling code, interleaved using an interleaver, or generated using a differential encoding technique,
wherein the access signature includes the spreading code, the scrambling code, and the interleaver, and
wherein the transmission signal includes information related to the spreading code, the scrambling code, or the interleaver.

7. The wireless communication method of claim 6, wherein the access signature includes any one of a demodulation reference signal (DMRS), a preamble, a spreading sequence information, scrambling code information, interleaver information, and differential encoding information about the transmission signal.

8. The wireless communication method of claim 6, wherein the transmission signal includes a reference signal.

9. An apparatus for wireless communication, comprising a memory and a processor, wherein the processor reads code from the memory and implements a method comprising:
  receive, by a network node, signals from user devices in a wireless communication network;
  obtain combined signals by combining, based on vectors from a pre-defined set of vectors, the signals received by the network node; and
  process the combined signals to obtain an estimate of the signals, wherein the combined signals are processed by the processor configured to:
    de-spread each combined signal using each spreading code from a set of pre-determined spreading codes;
    perform equalization on each de-spread combined signal to obtain a set of equalized combined signals;
    select a subset of equalized combined signals based on signal-to-interference-plus-noise ratio (SINR) values; and
    decode the selected equalized combined signals to obtain the estimate of information bits received from the user devices.

10. The apparatus of claim 9, wherein each vector corresponds to a code having a length equal to a number of receive antennas of the network node.

11. The apparatus of claim 9, wherein the signals are combined by the processor configured to:
  determine a weighted sum of the signals received from a plurality of receive antennas of the network node by a corresponding code of each vector.

12. The apparatus of claim 9, wherein the combined signals are processed by the processor configured to:
  perform differential decoding on each combined signal;
  select a subset of differential decoded combined signals based on signal-to-interference-plus-noise ratio (SINR) values; and
  decode the selected differential decoded combined signals to obtain the estimate of information bits received from the user devices.

13. The apparatus of claim 9,
  wherein the signals include reference signals, and
  wherein the combined signals are processed by the processor configured to:
    estimate a combined channel by using the reference signals in each combined signal; and
    process the combined signals using a previous estimate of the combined channel.

14. An apparatus for wireless communication, comprising a memory and a processor, wherein the processor reads code from the memory and implements a method comprising:
  generate a transmission signal to transmit from a user device in a wireless communication network,
    wherein the transmission signal includes data for processing by vectors from a set of pre-defined vectors,
    wherein the transmission signal is generated using an access signature selected by the user device,
    wherein the transmission signal is transmitted using a grant free transmission technique,
    wherein the transmission signal includes data that is spread using a spreading code, scrambled using a scrambling code, interleaved using an interleaver, or generated using a differential encoding technique,
    wherein the access signature includes the spreading code, the scrambling code, and the interleaver, and
    wherein the transmission signal includes information related to the spreading code, the scrambling code, or the interleaver.

15. The apparatus of claim 14, wherein the access signature includes any one of a demodulation reference signal (DMRS), a preamble, a spreading sequence information, scrambling code information, interleaver information, and differential encoding information about the transmission signal.

16. The apparatus of claim 14, wherein the transmission signal includes a reference signal.

* * * * *

UNITED STATES PATENT AND TRADEMARK OFFICE
CERTIFICATE OF CORRECTION

PATENT NO. : 11,245,462 B2
APPLICATION NO. : 16/991793
DATED : February 8, 2022
INVENTOR(S) : Zhifeng Yuan et al.

Page 1 of 2

It is certified that error appears in the above-identified patent and that said Letters Patent is hereby corrected as shown below:

In the Drawings

In Fig. 8, Sheet 8 of 9, delete Main designator "600" and insert -- 800 --, therefor.

In the Specification

In Column 3, Line 19, delete "a" and insert -- an --, therefor.

In Column 5, Line 64, delete "makes" and insert -- make --, therefor.

In Column 6, Line 52, delete "of an" and insert -- an --, therefor.

In Column 6, Line 59, delete "h1 = [11] and h2 = [-11]," and insert -- h1 = [1 1] and h2 = [-1 1], --, therefor.

In Column 7, Line 26, delete "$z_2=<v_2,y>$or" and insert -- $z_2=<v_2,y>$ or --, therefor.

In Column 7, Line 33, delete "shown" and insert -- are shown --, therefor.

In Column 8, Line 3, delete "$v_4=[1,-j]$, $v_5=[1,0]$, $v_6[0,1]$" and insert -- $v_4=[1,-j]$, $v_5=[1,0]$, $v_6=[0,1]$ --, therefor.

In Column 8, Line 27, delete "$v_5[1,0,0,1]$," and insert -- $v_5=[1,0,0,1]$, --, therefor.

In Column 8, Line 47, delete "$v=[1,1,0,0]$," and insert -- $v_1=[1,1,0,0]$, --, therefor.

In Column 8, Line 50, delete "$v_{14}=[1j,0,0]$," and insert -- $v_{14}=[1,-j,0,0]$, --, therefor.

In Column 12, Line 24, delete "[-1," and insert -- [1, --, therefor.

Signed and Sealed this
Seventh Day of June, 2022

Katherine Kelly Vidal
*Director of the United States Patent and Trademark Office*

CERTIFICATE OF CORRECTION (continued)
U.S. Pat. No. 11,245,462 B2

In Column 12, Line 67, delete "achieved." and insert -- achieved: --, therefor.

In Column 13, Line 19, delete "narrows" and insert -- narrow --, therefor.

In Column 14, in Equation (3), Line 10, delete

"$$M_k = \underset{k\ set}{\mathrm{argmin}} \left\{ \begin{bmatrix} c_k^* & 0_W^* \\ 0_W^* & c_k^* \end{bmatrix} R_y^{-1} \begin{bmatrix} c_k & 0_W \\ 0_W & c_k \end{bmatrix} \right\}$$" and insert $$M_k = \underset{k\ set}{\mathrm{arg\ min}} \left\{ \begin{bmatrix} c_k^* & 0_W^* \\ 0_W^* & c_k^* \end{bmatrix} R_y^{-1} \begin{bmatrix} c_k & 0_W \\ 0_W & c_k \end{bmatrix} \right\}$$

--, therefor.

In Column 14, Line 19, delete "$M_k\lambda_1\lambda_2$" and insert -- $M_k^{\lambda_1\lambda_2}$ --, therefor.

In Column 15, Line 16, delete "includes" and insert -- include --, therefor.

In Column 15, Line 24, delete "702," and insert -- 704, --, therefor.

In Column 16, Line 9, delete "each" and insert -- for each --, therefor.

In Column 17, Line 4, delete "(DVD)," and insert -- (DVDs), --, therefor.